United States Patent [19]

Steely et al.

[11] Patent Number: 4,845,619

[45] Date of Patent: Jul. 4, 1989

[54] MULTIPLEX SYSTEM FOR CONTROLLING THE POWER APPLIED TO LOADS SUCH AS VEHICLE HEADLAMPS

[75] Inventors: Lee W. Steely, Reinholds; Keith J. McKechnie, Shoemakersville, both of Pa.

[73] Assignee: AMP Incorporated, Harrisburg, Pa.

[21] Appl. No.: 130,133

[22] Filed: Dec. 8, 1987

[51] Int. Cl.⁴ .............................................. G06F 15/20
[52] U.S. Cl. ............................. 364/424.05; 307/10.8; 318/599; 340/469; 388/811
[58] Field of Search ........................... 364/424.05, 569; 307/10 R, 10 LS, 38, 40, 41, 157; 318/301, 308, 341, 599

[56] References Cited

U.S. PATENT DOCUMENTS

| | | | |
|---|---|---|---|
| 3,185,893 | 5/1965 | Sperling | 315/246 |
| 4,293,947 | 10/1981 | Brittain | 370/89 |
| 4,348,726 | 9/1982 | Igarashi et al. | 364/424.05 |
| 4,390,812 | 6/1983 | Seidler | 315/200 |
| 4,398,131 | 8/1983 | Tarroux et al. | 315/294 |
| 4,464,606 | 8/1984 | Kane | 315/158 |
| 4,513,232 | 4/1985 | Safiuddin | 318/341 |
| 4,570,108 | 2/1986 | Stroede et al. | 315/360 |
| 4,571,530 | 2/1986 | Sweeney, Jr. | 318/341 |
| 4,578,591 | 3/1986 | Floyd et al. | 364/424.05 |
| 4,621,313 | 11/1986 | Kiteley | 363/49 |
| 4,661,750 | 4/1987 | Mori | 318/599 |
| 4,682,168 | 7/1987 | Chang et al. | 340/825.65 |

Primary Examiner—Gary Chin
Attorney, Agent, or Firm—Bruce J. Wolstoncroft

[57] ABSTRACT

A vehicle multiplex system includes a controller and a number of remote stations connected to the controller by a control bus. The controller receives multiplexed signals indicative of the desired operation of loads such as headlamps and motors. In order to obtain reduced intensity headlamp operation or reduced speed of a continuous DC motor, the controller automatically connects and disconnects the headlamp or motor and a DC power source with a selected duty cycle. The period of repetition is sufficiently small to prevent perceptible flicker or fluctuation in motor speed. In this way, headlamp intensity and motor speed can be varied as desired, without increasing the hardware requirements of the system.

20 Claims, 10 Drawing Sheets

MULTIPLEX SYSTEM FOR CONTROLLING THE POWER APPLIED TO LOADS SUCH AS VEHICLE HEADLAMPS

BACKGROUND OF THE INVENTION

This invention relates to a multiplex control system which can be used to vary the power applied to a load such as an automotive headlamp in order to control the intensity of the headlamp.

It would be desirable in modern automotive vehicles to run the headlamps, and in particular the high beam headlamps, of the vehicle at reduced intensity during daytime vehicle operation. By operating the high beam headlamps at reduced intensity, the vehicle is made more visible to oncoming drivers. High beams operated at full intensity can be annoying to other traffic, and by operating the high beams at reduced intensity the life of the lamp is markedly increased.

It has been suggested that such reduced intensity operation can be provided by connecting the headlamp in series with a power resistor to reduce the voltage applied to the lamp on a continuous basis during daylight operation. This approach provides the disadvantages of increased power drain on the electrical system of the vehicle and the heat and expense associated with suitable power resistors.

For some time there has been an interest in applying multiplex systems to control the components of vehicles such as automobiles. Britain U.S. Pat. No. 4,293,947 is one example of such a multiplex system. In spite of this interest, currently available vehicle multiplex systems do not fully exploit the potential of such systems for providing improved control functions in vehicles.

Another, previously unrelated set of patents relates to the use of pulse width modulation techniques to control the intensity of fluorescent lamps and incandescent lamps. Stroede U.S. Pat. No. 4,570,108 discloses a control system for an incandescent lamp which varies the duty cycle with which power is applied to the lamp in order to reduce maximum current in the lamp during start-up conditions and to dim the lamp. Similarly, Kane U.S. Pat. No. 4,464,606 and Tarroux U.S. Pat. No. 4,398,131 use pulse width modulation techniques to vary the intensity of lamps. None of these patents relates to multiplex systems, and all require special purpose, complicated, and relatively expensive circuitry to accomplish the desired pulse width modulation.

SUMMARY OF THE INVENTION

This invention relates to a vehicle headlamp control system for a vehicle of the type comprising a headlamp, an electrical power source, means for selectively interconnecting the headlamp and the power source with a low resistance current path and disconnecting the headlamp and the power source, and a multiplex system. The multiplex system comprises a controller and a first remote station coupled to receive a headlamp on signal and connected to the controller. This first remote station comprises means for sending first multiplexed signals to the controller indicative of the state of the headlamp on signal. A second remote station included in the multiplex system is connected to the controller and comprises means for receiving a second multiplexed signal from the controller and for controlling the interconnecting means in response to the state of the second multiplexed signal. First means are included in the controller for selectively generating the second multiplexed signal in a first state, which causes the second remote station to control the interconnecting means to interconnect the headlamp and the power source, and a second state, which causes the second remote station to control the interconnecting means to disconnect the headlamp and the power source.

According to this invention, the first means includes means for automatically cycling the second multiplexed signal between the first and second states at a first duty cycle during selected periods characterized by the absence of the headlamp on signal in order to illuminate the headlamp at reduced intensity. The first means also includes means for automatically placing the second multiplexed signal in the first state with a second duty cycle higher than the first duty cycle during selected periods characterized by the presence of the headlamp on signal in order to illuminate the headlamp at increased intensity.

It has also been discovered that the system described in the preceding paragraph can be adapted to vary the speed of a continuous DC motor such as a fan motor. By alternately applying full voltage and removing full voltage in a repeated pattern with a variable duty cycle, the average power applied to the motor and therefore the speed of the motor can be controlled as desired.

The multiplex control system of this invention provides a number of important advantages. In particular, the lamp dimming and the motor speed control functions are provided with little or no increase in system hardware. These functions can simply be programmed into the controller of the multiplex system, and thus can be provided at substantially no additional production cost. Furthermore, since the power supply is alternately connected to and disconnected from the headlamp or motor, the headlamp can be dimmed or the motor speed varied without any resistance losses of the type described above. Since the control functions are programmed into the controller, they can easily be modified or adjusted as necessary for particular applications. For example, if various models of headlamps require differing duty cycles in order to achieve the desired reduced intensity, a simple programming change is all that is required. Finally, a large number of levels of power (and therefore motor speed or lamp intensity) can be obtained at low cost, simply by providing the appropriate control signals to the multiplex system.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
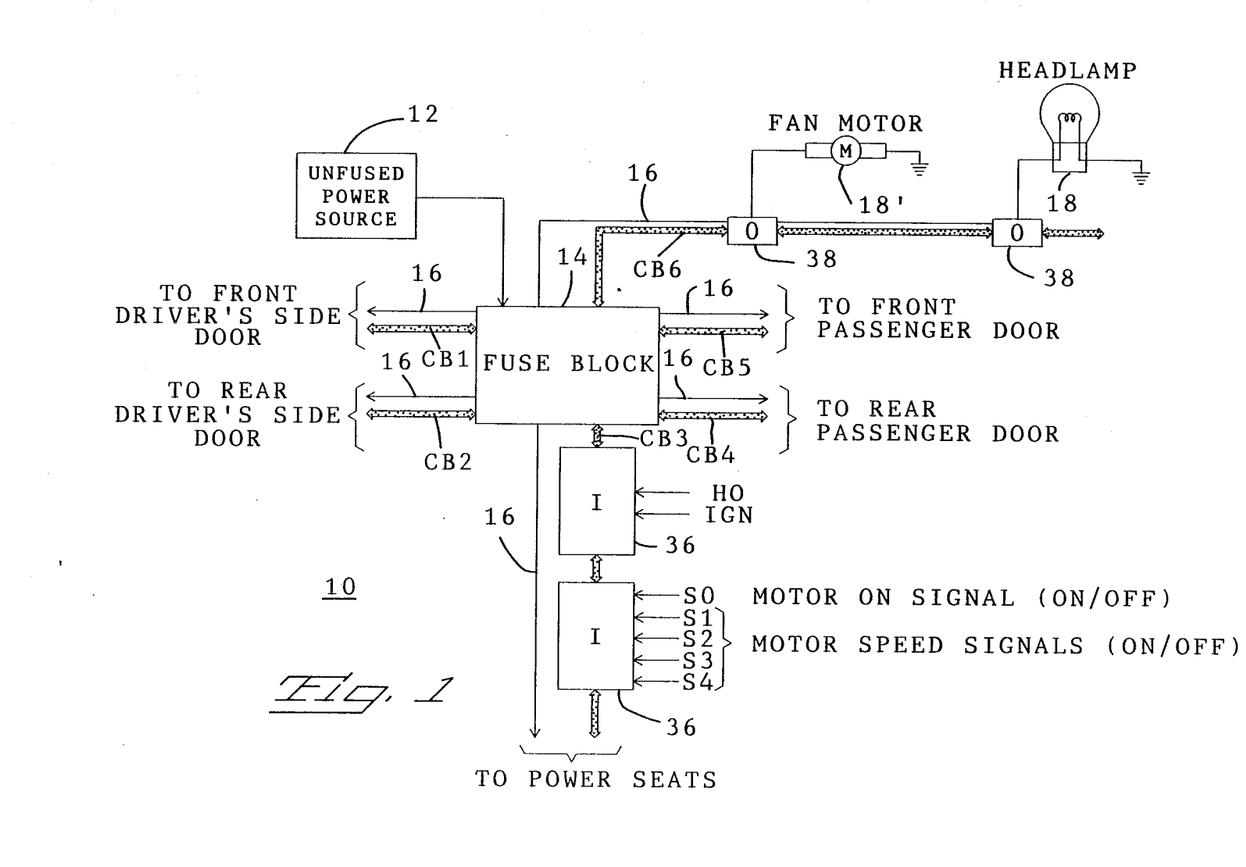
FIG. 1 is a block diagram of a vehicle multiplex system which incorporates a presently preferred embodiment of this invention.

Turning now to the drawings, FIG. 1 shows a vehicle multiplex system 10 which is adapted for use with a vehicle such as an automobile of the type which includes an unfused power source 12 and a fuse block 14. A number of DC power buses 16 radiate from the fuse block 14, along with a number of parallel control buses CB1-CB6. FIG. 1 is not intended to show the entire multiplex system of the vehicle, but only those portions are important to understanding the operation of this embodiment. As shown in FIG. 1, control bus CB3 receives input signals indicative of whether the headlamp is to be switched on or off, whether the ignition is on or off, whether the fan motor is to be switched on or off, and the desired fan motor speed. In addition, the control bus CB6 controls power as described below to a headlamp 18 and a fan motor 18'.

Figure 2:
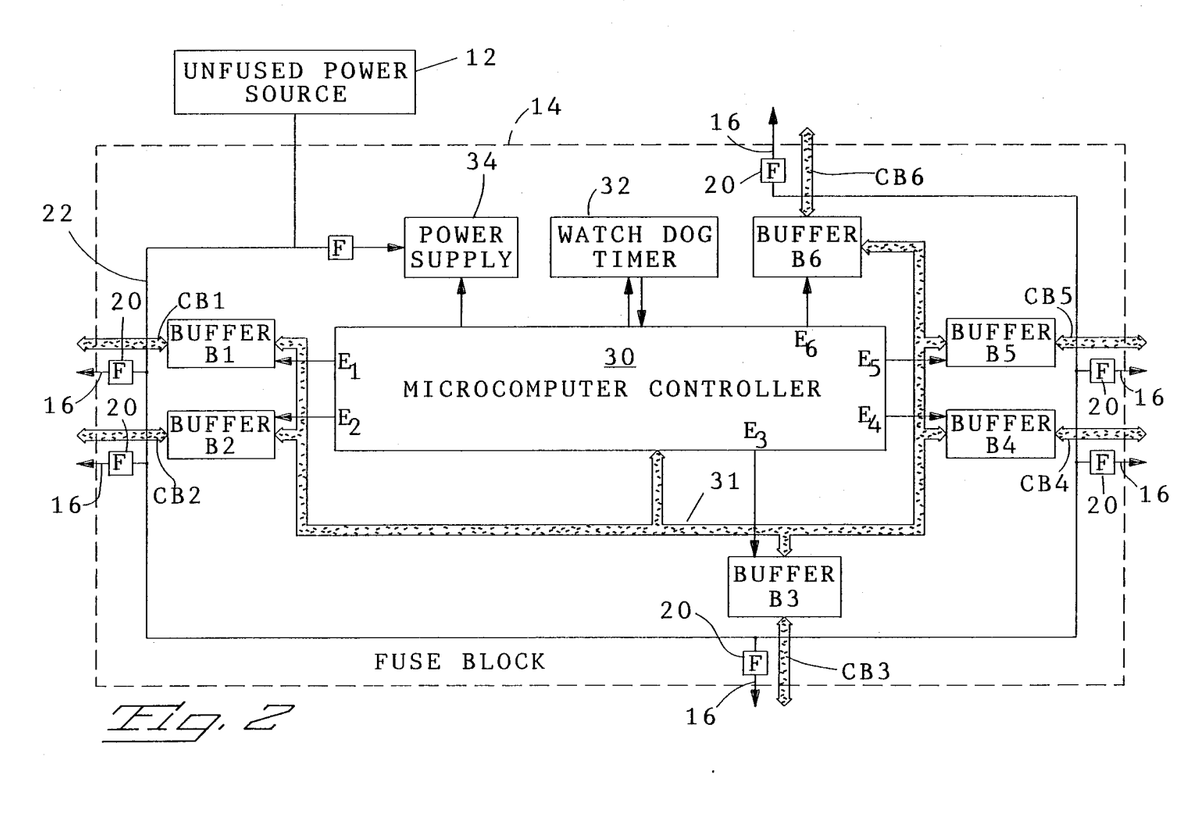
FIG. 2 is a block diagram of the fuse block of FIG. 1.

FIG. 2 shows a more detailed block diagram of the fuse block 14. Fuses 20 are interconnected between the unfused power source 12 and each of the power buses 16. In addition, the fuse block 14 includes a microcomputer controller 30, a watch dog timer 32, a power supply 34, and a number of buffers B1-B6. The controller 30 applies control signals to a control bus 31 and reads multiplexed signals from the control bus 31, and the buffers B1-B6 are controlled to ensure that the control bus 31 is interconnected with only one of the control buses CB1-CB6 at any given time. In this way, the total length of active control bus is minimized, thereby reducing electromagnetic interference and noise susceptibility. Reliability is also improved in that a short in any one of the control buses CB1-CB6 will not interfere with proper operation of the remaining control buses.

Figure 3:
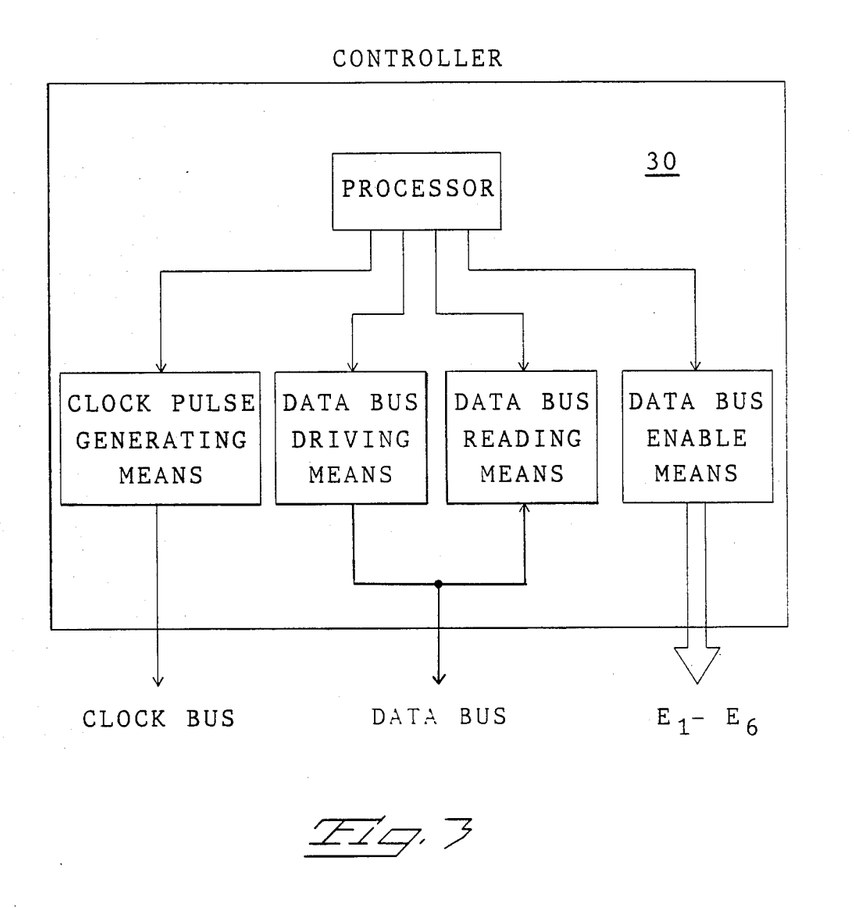
FIG. 3 is a block diagram of the controller of FIG. 2.

As shown in FIG. 3, the controller 30 includes a clock pulse generating means which generates sets of clock pulses on a clock bus, along with data bus driving means and data bus reading means for applying multiplexed signals to and reading multiplexed signals from a data bus, respectively. The clock and data buses are both included in the control bus 31. The controller 30 also includes buffer enable means which generates enable signals E1-E6 to control the buffers B1-B6, and each of these four means is controlled by a processor.

The processor controls the clock pulse generating means to generate clock pulses in sets separated by a period of no clock pulses. Each set of clock pulses comprises n subsets, where n is equal to the total number of separately addressed remote stations, as described below. Each subset includes eight clock pulses, and each clock pulse defines a respective data transmission time slot or channel on the data bus. Thus, each remote station is enabled for one subset of clock pulses (consisting of eight clock pulses and therefore eight time slots) within each set of clock pulses. The processor maintains a table of the state of all of the data channels, including both commands (sent from the controller 30 to the remote stations) and responses (sent from the remote stations to the controller 30). The data bus driving means of the controller 30 uses this table to drive the data bus high or low as appropriate to ensure that commands are sent by the controller 30 to the remote stations at appropriate times to transmit the command portion of the table. The data bus reading means of the controller 30 samples and stores the state of the data bus at appropriate times to ensure that responses from the remote stations are stored in appropriate locations of the table.

The multiplex system 10 of FIG. 1 includes input units 36 and output units 38 that are coupled to the control buses. The input units 36 convert standard signals into a time multiplexed format and apply them at appropriate times to the respective control buses. The output units 38 read the state of the data bus of the control bus at selected times, and latch the reading, which is then used for control purposes.

Figure 5:
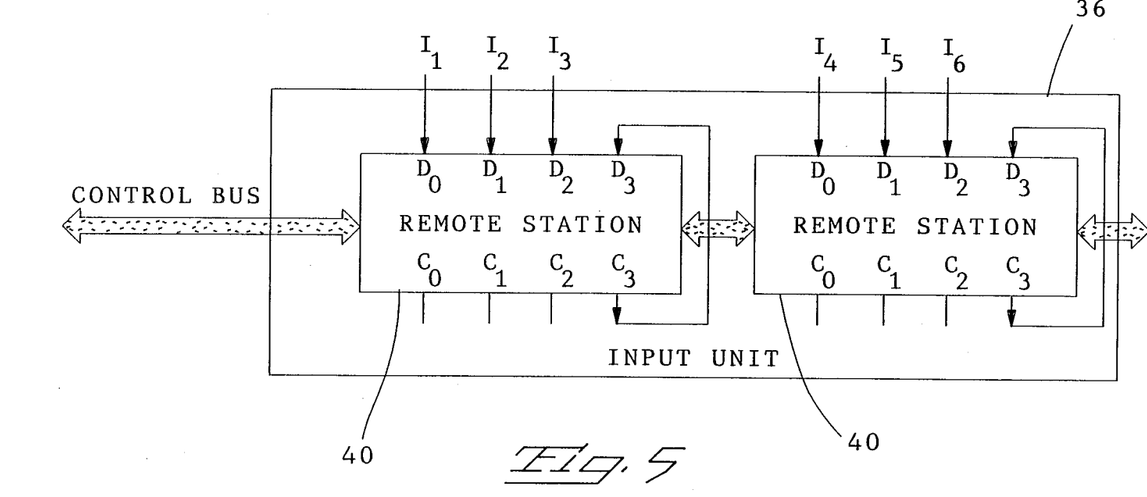
FIG. 5 is a block diagram of one of the input units of FIG. 1.

FIG. 5 shows a block diagram of one of the input units 36. As shown in FIG. 5, each input unit 36 includes two remote stations 40, each of which has inputs D0-D3 for four data signals to be multiplexed and applied to the control bus, and outputs C0-C3 for four command signals which are read from the control bus, demultiplexed, and applied as outputs on the respective terminals. As shown in FIG. 5, control output C3 is applied directly to data input D3 to check for proper operation of each remote station 40.

Figure 4:
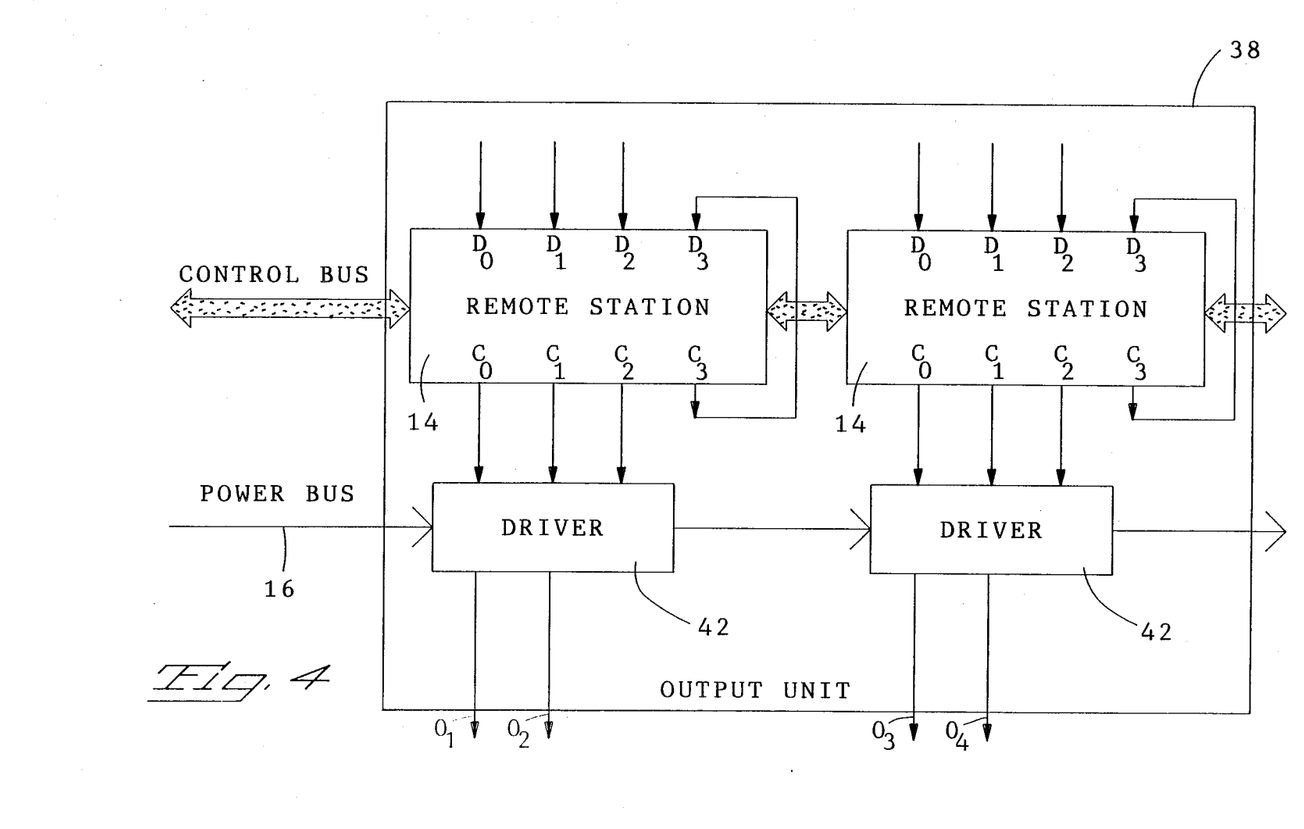
FIG. 4 is a block diagram of one of the output units of FIG. 1.

FIG. 4 shows a block diagram of one of the output units 38, which also includes two remote stations 40 of the type described above. Each output unit 38 also includes two drivers 42 which are interconnected with the power bus 16. Depending upon the state of the control signals C0-C2, the drivers 42 either apply 12 VDC or 0 VDC to power outputs 01-04.

Figure 6:
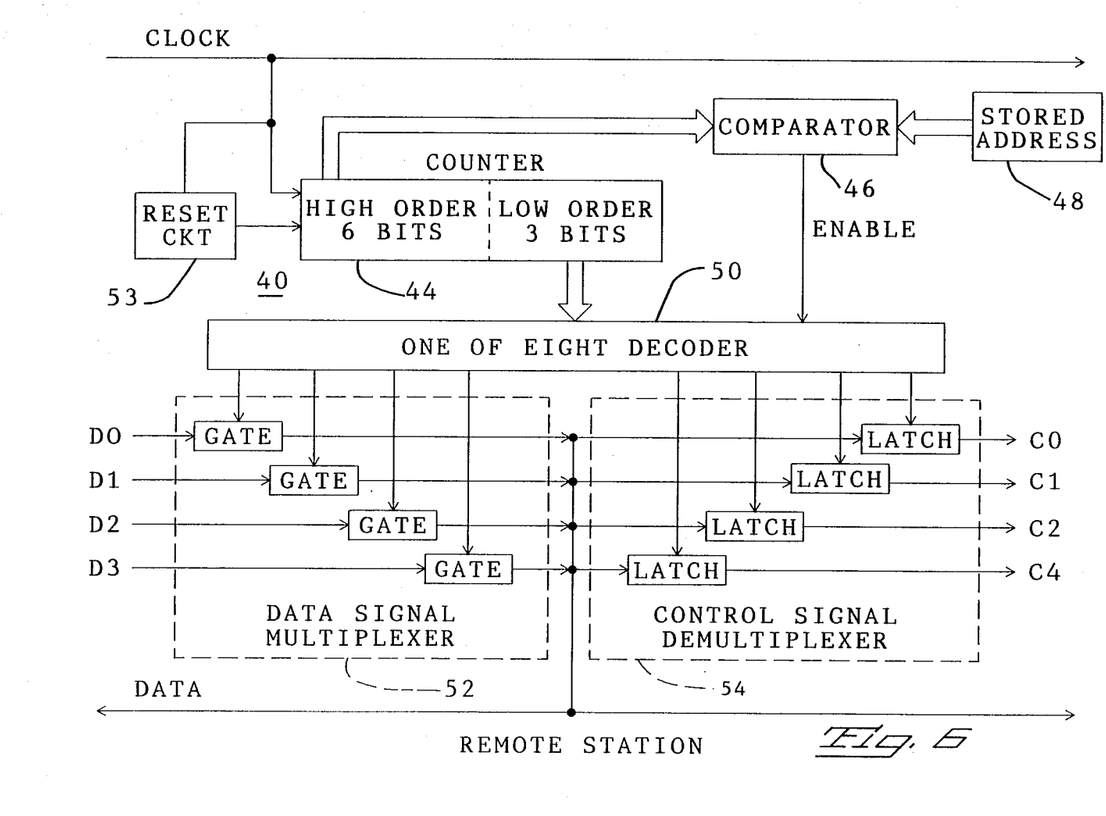
FIG. 6 is a block diagram of one of the remote stations of FIGS. 4 and 5.

FIG. 6 shows a block diagram of one of the remote stations 40, which interacts with both the clock bus and the data bus included in the control bus. Each remote station 40 includes an eight bit counter which has a higher order 6 bit section and a lower order 3 bit section. This counter is responsive to the clock pulses on the clock bus. The high order 6 bits of the counter 44 are compared in a comparator 46 with a stored 6 bit address stored in the means 48. When the high order 6 bits of the counter 44 are equal to the stored address in the means 48, the comparator 46 enables a decoder 50 that decodes the low order 3 bits of the counter 44. Typically, each of the remote stations 40 in the system will have a unique address. The remote station 40 includes a data signal multiplexer 52 which includes four gates, each operating to gate a respective one of the data signals D0-D3, as well as a control signal demultiplexer 54 which includes four latches, each arranged to latch and hold a respective one of the control signals C0-C3. Each of the gates and each of the latches is connected to the data bus included in the control bus.

For the eight clock pulse cycles during which the comparator 46 enables the decoder 50, the decoder 50 sequentially enables respective ones of the gates and latches. When any one of the gates is enabled, it applies the respective data signal D0-D3 to the data bus. Similarly, when any of the latches is enabled, it latches and holds the state of the data bus at the corresponding time, and applies the latched state as a command signal C0-C3.

In order to synchronize the counter 44 with the controller 30, the remote station 40 includes a reset circuit 53 which monitors the clock bus for an absence of clock pulses. Whenever the reset circuit 53 fails to detect a clock pulse for a selected time interval, the reset circuit resets the counter 44 to zero. The controller transmits the clock pulses in sets, and each set is separated by a period of no clock pulses longer than the selected time interval of the reset circuit 53. Thus, the reset circuit 53 resets the counter 44 between each set of clock pulses.

The present invention is not limited to the particular type of vehicle multiplex system described above; however, further features of this multiplex system can be found in U.S. patent application Ser. Nos. 107,623 (filed Oct. 9, 1987), which defines the presently preferred construction for the fuse block 14, buses CB1-CB6, input and output units 36, 38; 064,917 (filed June 19, 1987), which defines the presently preferred structure for the driver 42; and 837,911 (filed Mar. 10, 1986), which defines the presently preferred structure for the data bus driving and reading means of the controller; along with U.S. Pat. No. 4,682,168, and which define the presently preferred embodiment for the remote station 40. In addition, the discussion of the Type A remote stations in U.S. patent application Ser. No. 921,185, filed Oct. 21, 1986, provides additional information about the remote station 40. All of these patent documents are hereby incorporated by reference.

According to this invention, the controller 30 of FIG. 2 is programmed to control the intensity of the headlamp 18 of FIG. 1 in accordance with selected data inputs. In particular, in this embodiment the controller 30 receives two multiplexed signals from one of the input units 36: a headlamp on signal HO and an ignition signal IGN. The headlamp on signal can be generated either by an automatic headlamp control system or by a manual switch, and indicates whether or not the headlamp is to be switched on at full intensity. The ignition signal can simply be a switched 12 volt signal that is indicative of whether or not the vehicle ignition is switched on in the run mode.

The two signals HO and IGN are used in the following discussion to illustrate one way in which two signals can be used to select automatic illumination of a high beam headlamp during daytime vehicle operation. Of course, many other combinations of input signals can be used as well. For example, a vehicle having an automatic system for activating the headlamps at night will typically provide a day/night signal indicative of ambient light levels. In such a vehicle the day/night signal and the IGN signal can be used (perhaps in combination with the HO signal) to select daytime operation of the headlamps at reduced intensity. Similarly, the IGN signal may be replaced or supplemented by other signals (including manual control signals).

Figure 7:
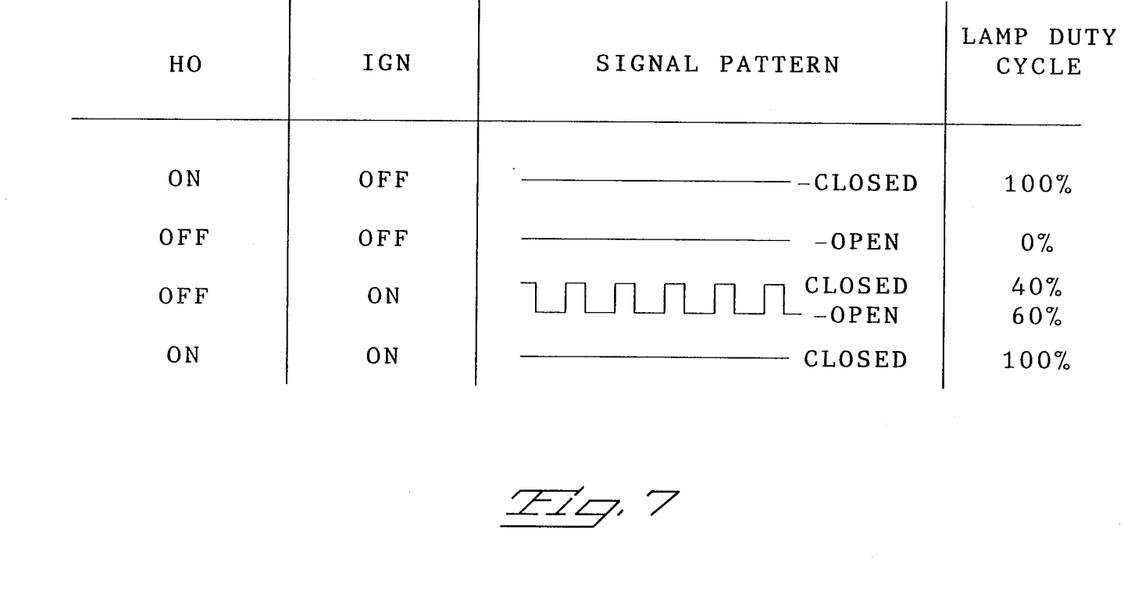
FIG. 7 is a table illustrating the manner in which the headlamp of FIG. 1 is controlled.

FIG. 7 provides a table that illustrates the manner in which the controller 30 is programmed to control the headlamp 18. The left two columns of FIG. 7 define the states of the headlamp on signal HO and the ignition signal IGN. As shown in the upper two rows, when the ignition signal is off, the controller 30 controls the headlamp 18 in accordance with the headlamp on signal in the conventional manner, and thus the duty cycle is either 0% or 100%. When the ignition signal is on and the headlamp on signal is off, the controller 30 automatically controls the output unit 38 and its respective driver 42 to alternately apply 12 VDC and 0 VDC to the headlamp 18 with a 40% duty cycle. Preferably, the period of the cycle is about 16 milliseconds. At this high repetition rate, no flicker is apparent when the headlamp is operated at reduced intensity. Finally, as shown in the last row of FIG. 7, when both the headlamp on signal and the ignition signal are on, the controller 30 applies 12 VDC to the headlamp 18 with 100% duty cycle. In this way, the headlamp 18 is operated at full intensity.

Figure 8:
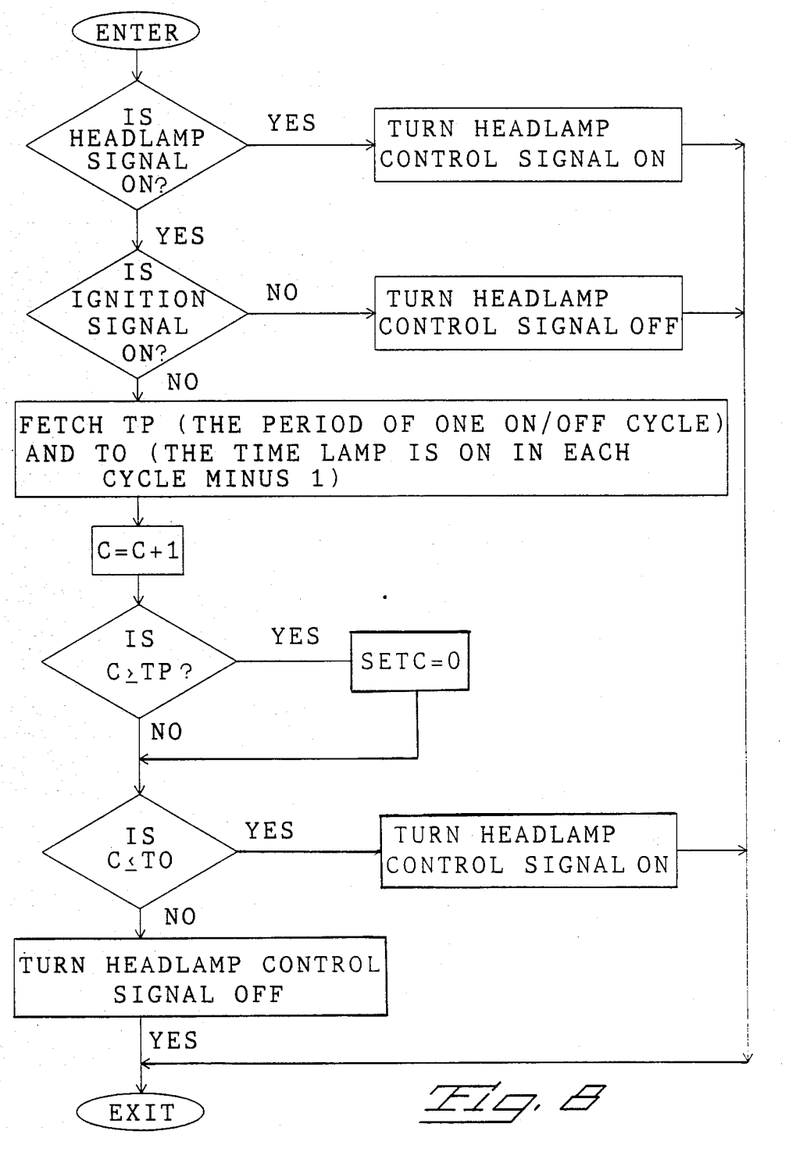
FIG. 8 is a flow chart of a program executed by the controller of FIG. 2 to control the headlamp.

FIG. 8 shows the flow chart of a routine executed by the controller 30 to perform the functions described above. This routine is executed once every two milliseconds, with each cycle of operation of the multiplex control system. In this routine, the controller 30 is responsive to two multiplexed signals, one indicative of the state of the ignition signal, and the other indicative of the state of the headlamp on signal. This routine causes a headlamp control signal to be placed in either the on or off state. The headlamp control signal is then multiplexed by other routines of the controller 30 and directed to the appropriate output unit for control of the associated driver and headlamp.

In the routine of FIG. 8, first the state of the headlamp on signal is checked. If the headlamp on signal is on, the headlamp control signal is placed in the on state. Alternately, if the headlamp on signal is off, the state of the ignition signal is checked. If the ignition signal is off, then the headlamp control signal is placed in the off state. When the headlamp control signal is in the on state, 12 VDC is continuously applied to the headlamp 18 by the associated driver. In the event the ignition signal is on but the headlamp on signal is off, the routine then fetches $T_P$ (the period of one on/off cycle) and $T_O$ (the time the lamp is to be on in each cycle minus 1). In this example $T_P$ is equal to 8 and $T_O$ is equal to 2. $T_P$ and $T_O$ correspond to cycles of the multiplex system, which as mentioned above is equal to 2 milliseconds in this preferred embodiment. Thus, the period of one on/off cycle in this example is 16 milliseconds and the driver is commanded to apply power to the headlamp for a total of 6 milliseconds within each 16 millisecond cycle. The routine then increments a variable C and compares C with $T_P$. If C is greater than or equal $T_P$ then C is set to zero. C is then compared with $T_O$. If C is less than or equal to $T_O$, then the headlamp control signal is turned on. Alternately, if C is greater than $T_O$, then the headlamp control signal is turned off.

From this description it should be apparent that the multiplex system responds to the ignition signal and the light switch signal to operate the headlamp automatically at full intensity when the light switch signal is on, and at reduced intensity when the ignition is on but the light switch is off. In this way, the headlamps are always illuminated when the ignition is on, at least at reduced intensity. Reduced intensity headlamps are thereby automatically provided whenever the vehicle is operated. Multiplex control for the headlamp would typically require a controller and input and output units, as for example of the type described above. Thus, the headlamp dimming function described above is provided at no increase in hardware cost. Rather, the function is provided entirely by improved programming of the controller, and thus at extremely low increase in the cost to manufacture the entire system. Furthermore, since headlamp intensity is controlled by alternately connecting and disconnecting the lamp from the 12 VDC power source, there are no excessive resistance losses in the system.

It has been discovered that techniques similar to those described above in conjunction with headlamp control can be used to control the speed of a continuous DC motor such as a fan motor.

FIG. 1 shows the multiplex control system as having an input unit 36 which receives five fan motor control signals: a motor on signal S0 and motor speed signals S1-S4. Each of these five signals is an on/off signal which is multiplexed by the input unit 36 and passed to the controller 30 via the control bus CB3. Of course, in alternate embodiments desired motor speed can be commanded in other ways. For example, the controller 30 can be programmed to maintain a counter which indicates commanded motor speed, and to increment and decrement this counter in response to respective control signals. This approach further reduces the total number of switches and system inputs required. However, the following discussion focuses on the use of signals S0–S4 as a comparatively simple embodiment.

Figure 9:
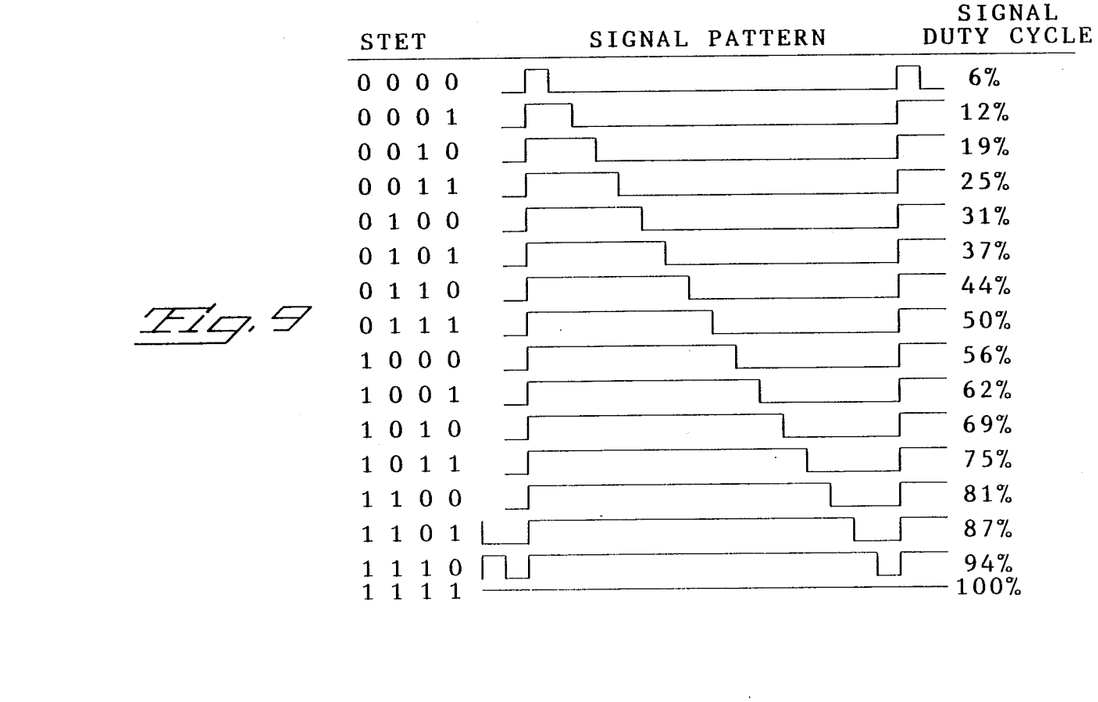
FIG. 9 is a table illustrating the manner in which the fan motor of FIG. 1 is controlled.

FIG. 9 shows the manner in which the controller 30 is programmed to control the fan motor 18' in response to the motor control signals S0–S4. When the motor on signal S0 is off, the fan motor 18' is disconnected from the power supply and is operated at a 0% duty cycle. When the motor on signal S0 is on, the motor speed signals S1–S4 are decoded to a number between 1 and 16 and the controller 30 then controls the output unit 38 associated with the fan motor 18' so as to connect the fan motor 18' to the power bus 16 with a duty cycle determined by the state of the motor speed signals S1–S4. In this embodiment the period of one on/off cycle is 32 milliseconds, corresponding to 16 cycles of the multiplex system. The duty cycle for the fan motor 18' is controlled between 6% and 100% in accordance with the motor speed signals S1–S4. This provides 16 discrete levels of power to the fan motor 18' and therefore 16 fan speeds. It has been discovered that this approach can be used without undesirable fluctuations in fan speed or fan motor operation.

Figure 10:
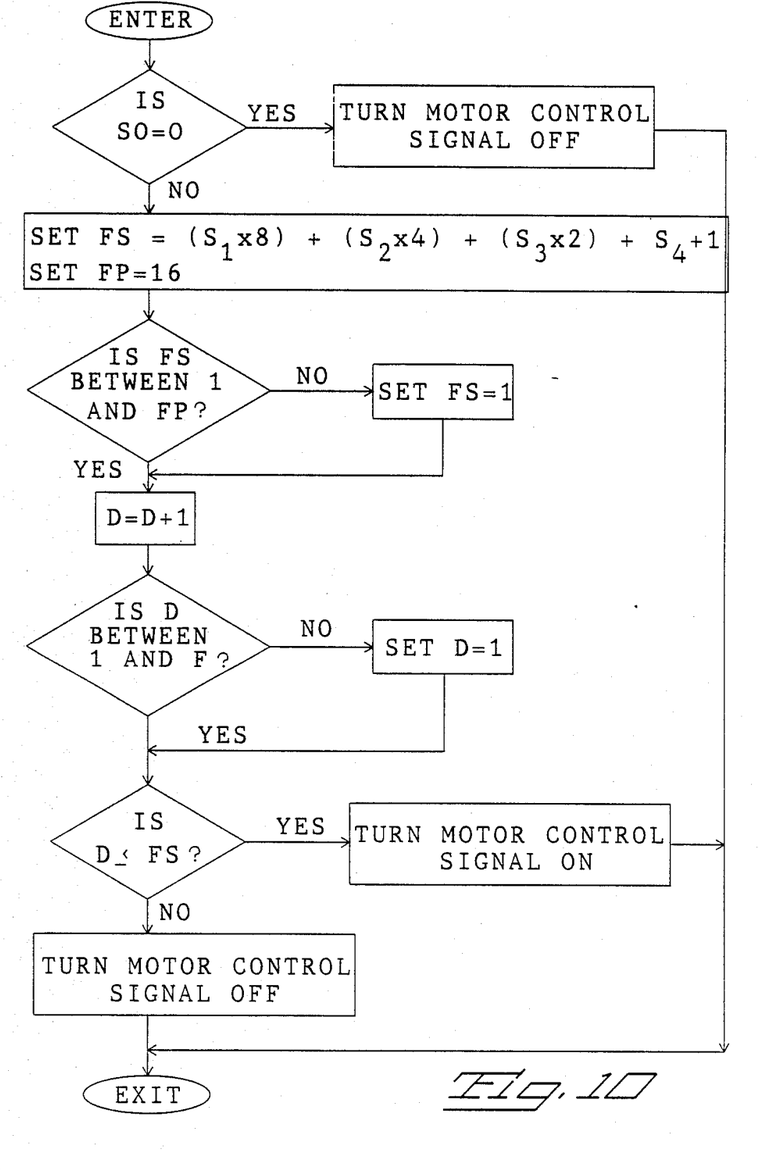
FIG. 10 is a flow chart of a program executed by the controller of FIG. 2 to control the fan motor.

FIG. 10 shows a flow chart of a program executed by the controller 30 to accomplish this function. The program of FIG. 10 is responsive to multiplexed signals generated by the associated input unit 36 indicative of the state of the motor on signal S0 and the motor speed signals S1–S4. This routine generates a motor control signal which is in either the on or off state. This motor control signal is then multiplexed during the appropriate time slot of each cycle of the multiplex system so that it will be read and latched by the appropriate output unit 38 to control the driver associated with the fan motor 18'.

The program of FIG. 10 first checks the motor on signal S0. If S0 is in the off state then the motor control signal is turned off. Otherwise, the variable FS is set equal to the number encoded in the motor speed signals S1–S4 and the variable FP is set equal to 16. Thus, FS is decoded as a number between 1 and 16, depending upon the states of the motor speed signals S1–S4. FS is then checked to ensure that it is between 1 and 16 as a precaution. If not, FS is set equal to 1. Then a variable D is incremented and checked to ensure that D is between 1 and FP. If not, D is set equal to 1. FS is then compared with D. If FS is greater than or equal to D, then the motor control signal is turned on. Otherwise, the motor control signal is turned off.

In the routine of FIG. 10, D cycles between 1 and 16, the motor control signal is on for the time period when D is less than or equal to FS, and the motor control signal is off otherwise.

Returning to FIG. 9, when the motor speed control signals S1–S4 are in the state 0111 (corresponding to FS equal to 8) D will be less than or equal to FS for the first eight cycles of each period and D will be greater than FS for the last eight cycles for each period. This corresponds to a duty cycle of 50%, in which the driver is commanded to apply 12 VDC to the fan motor 18' only during 50% of the time, and the driver is commanded to apply no power to the fan motor 18' for the remaining 50% of the time in each 32 millisecond period. This has been found to result in reduced speed fan operation without any undesirable fan operation characteristics.

FIGS. 9 and 10 illustrate the ease with which a large number of progressively varied duty cycles can be obtained, at no additional expense other than the small amount of programming required to implement the system. Once suitable motor speed control switches are provided, the multiplex system can be used to accomplish the desired adjustment of the duty cycle, and therefore of the average power applied to the motor, in a simple, efficient, and reliable manner.

Table 1 provides object code listings of presently preferred embodiments of the routines flow charted in FIGS. 8 and 10. These object code routines can be executed on an Intel 8051 microprocessor. The following information is provided to define the operating environment of these routines.

The Routine of FIG. 8 corresponds to the listing titled Headlamp Module. This listing receives the following inputs:

| | |
|---|---|
| DATA 33H (BIT 7) = | 1 if automatic Headlamp activation system is on; |
| DATA 33H (BIT 6) = | 0 if Low beams are off; |
| DATA 39H (BIT 5) = | 1 if vehicle ignition is in Run or Start mode; |
| PORT BIT P3.2 = | 0 if vehicle ignition is in Run or Accessory mode; |
| BIT 5CH = | 0 if Routine is enabled. |

All of the stated conditions must exist for the Headlamp Module to operate the headlamps at reduced intensity.

In addition, the Headlamp Module receives as inputs two bits from Port Bit P2.0 and P2.1 that set $T_P$ and $T_O$ as follows:

| P2.1 | P2.0 | $T_P$ | $T_O$ | Lamp Duty Cycle |
|---|---|---|---|---|
| 0 | 0 | 10 | 1 | 10% |
| 0 | 1 | 6 | 1 | 20% |
| 1 | 0 | 7 | 2 | 30% |
| 1 | 1 | 8 | 3 | 40% |

The listed duty cycles differ from the theoretical values due to switching delays in the driver included in the output unit.

The Headlamp Module sets the low order 4 bits of DATA 21H as a headlamp control signal to control illumination of the headlamp. Bit 0 is a diagnostic bit; bit 1 is a charge pump control bit for the charge pump included in the driver for the headlamp as described in detail in above-referenced U.S. patent application Ser. No. 064,917 (filed June 19, 1987); and bits 2 and 3 are parallel on/off bits for the headlamp driver. The driver of patent application Ser. No. 064,917 has been modified by removing two FET's and arranging the remaining two FET's to operate in parallel. In this way resistance and resistive heating are reduced.

The routine of FIG. 10 corresponds to the listing entitled Fan Module. This listing receives the following inputs:

DATA 39H (BIT 5)=1 if vehicle ignition is in the Run or Start Mode;
PORT BIT P3.2=0 if vehicle ignition is in Run or Accessory Mode;
DATA 39H (BIT 6)=Motor On/Off (S0);

DATA 49H = Currently commanded fan duty cycle (FS in FIG. 10);

DATA 06H = D (between 1 and 16) incremented with every loop through the routine.

The Fan Module turns the Motor Control Signal off unless DATA 39H (BIT 5)=1, PORT BIT P3.2=0 and DATA 39H (BIT 6)=1.

The Fan Module controls the fan by setting the high order 4 bits of DATA 20H. The driver for the fan motor 18' is identical to that described above, and the high order four bits of DATA 20H are used as a diagnostic bit (bit 4), a charge pump control bit (bit 5), and parallel on/off bits (bits 6 and 7).

Of course, it should be understood that a wide range of changes and variations can be made to the preferred embodiments described above. For example, the headlamp dimming system described above can be implemented with other types of multiplex systems, including systems with fiber optic buses, or with buses with a greater or lesser number of conductors. Furthermore, the motor speed control system described above can be implemented with other types of multiplex systems, and it can be applied to other types of continuous DC motors. Of course, the period of each on/off cycle and the effective duty cycle can all be modified as desired. Furthermore, it is not necessary to position the controller in the fuse block, or to use radiating control buses of the type described above in all cases.

It is therefore intended that the foregoing detailed description be regarded as illustrative rather than limiting, and that it be understood that it is the following claims, including all equivalents, which are intended to define the scope of this invention.

1. In a vehicle headlamp control system for a vehicle of the type comprising a headlamp; an electrical power source; means for generating a headlamp on signal; means for selectively interconnecting the headlamp and the power source with a low resistance current path and disconnecting the headlamp and the power source; a multiplex system comprising: a controller; a first remote station coupled to receive the headlight on signal and connected to the controller, said first remote station comprising means for sending first multiplexed signals to the controller indicative of the state of the headlamp on signal; and a second remote station connected to the controller and comprising means for receiving a second multiplexed signal from the controller and for controlling the interconnecting means in response to the state of the second multiplexed signal; first means, included in the controller, for selectively generating said second multiplexed signal in a first state, which causes the second remote station to control the interconnecting means to interconnect the headlamp and the power source, and a second state, which causes the second remote station to control the interconnecting means to disconnect the headlamp and the power source; the improvement comprising:

means, included in the first means, for automatically cycling the second multiplexed signal between the first and second states at a first duty cycle during selected periods characterized by the absence of the headlamp on signal in order to illuminate the headlamp at reduced intensity; and means, included in the first means, for automatically placing the second multiplexed signal in the first state with a second duty cycle higher than the first duty cycle during selected periods characterized

TABLE I

| MEMORY ADDRESS | | | | | | | | | | | | | | | | |
|---|---|---|---|---|---|---|---|---|---|---|---|---|---|---|---|---|
| 000000: | 02 | 02 | 02 | C2 | A0 | 32 | FF | FF | FF | FF | FF | 80 | 17 | FF | FF | FF |
| 000010: | FF | FF | FF | C2 | AA | 32 | FF | FF | FF | FF | FF | 32 | FF | FF | FF | FF |
| 000020: | FF | FF | FF | 32 | 75 | 8A | 62 | 75 | 8C | 7D | C0 | E0 | C0 | D0 | E5 | 2F |
| 000030: | 24 | 01 | F5 | 2F | 50 | 02 | 05 | 2E | 15 | 44 | 15 | 43 | 15 | 42 | 15 | 41 |
| 000040: | 15 | 40 | 15 | 5F | 15 | 7D | D0 | D0 | D2 | D5 | D0 | E0 | 32 | FF | FF | 20 |
| 000050: | 28 | 63 | 29 | 20 | 43 | 6F | 70 | 79 | 72 | 69 | 67 | 68 | 74 | 20 | 31 | 39 |
| 000060: | 38 | 37 | 20 | 41 | 4D | 50 | 20 | 49 | 6E | 63 | 6F | 72 | 70 | 6F | 72 | 61 |
| 000070: | 74 | 65 | 64 | 20 | 41 | 6C | 6C | 20 | 52 | 69 | 67 | 68 | 74 | 73 | 20 | 52 |
| 000080: | 65 | 73 | 65 | 72 | 76 | 65 | 64 | 2E | 20 | 54 | 41 | 53 | 48 | 20 | 53 | 79 |
| 000090: | 73 | 74 | 65 | 6D | 2D | 54 | 43 | 41 | 44 | 32 | 2E | 41 | 42 | 53 | 38 | 20 |
| 0000A0: | 44 | 41 | 54 | 45 | 3A | 31 | 30 | 2F | 31 | 34 | 2F | 38 | 37 | D2 | D4 | D2 |
| HEADLAMP MODULE | | | | | | | | | | | | | | | | |
| 0001AC: | E5 | 33 | 20 | 5C | 0E | 20 | E6 | 0B | 20 | E7 | 08 | 20 | B2 | 05 | E5 | 39 |
| 0001BC: | 20 | E5 | 0F | 43 | 21 | 0F | 22 | 53 | 21 | F0 | 43 | 21 | 07 | A2 | 67 | 92 |
| 0001CC: | 09 | 22 | E5 | A0 | 54 | 03 | 23 | F5 | F0 | 90 | 01 | F5 | 93 | F5 | 45 | 05 |
| 0001DC: | 76 | E5 | 76 | B5 | 45 | 00 | 40 | 83 | 75 | 76 | 00 | E5 | F0 | 04 | 93 | B5 |
| 0001EC: | 76 | 00 | 50 | D3 | 43 | 21 | 0F | 80 | D4 | 0A | 00 | 06 | 00 | 07 | 01 | 08 |
| 0001FC: | 02 | | | | | | | | | | | | | | | |
| FAN MODULE | | | | | | | | | | | | | | | | |
| 000AD5: | C2 | D3 | C2 | D4 | E5 | 39 | F4 | 54 | 60 | 70 | 05 | D2 | B2 | 30 | B2 | 07 |
| 000AE5: | 43 | 20 | F0 | 53 | 2C | C0 | 22 | 85 | 4C | F0 | D2 | A4 | 30 | A4 | 12 | C2 |
| 000AF5: | F1 | 53 | 4A | F0 | D2 | A5 | 30 | A5 | 1D | C2 | F0 | 53 | 4A | 0F | 02 | 0B |
| 000B05: | 31 | E5 | 4A | 54 | 0F | 04 | B4 | 10 | 04 | D2 | F1 | 80 | E7 | C2 | F1 | 53 |
| 000B15: | 4A | F0 | 42 | 4A | 80 | DE | E5 | 4A | C4 | 54 | 0F | 04 | B4 | 10 | 05 | D2 |
| 000B25: | F0 | 02 | 0B | 31 | C2 | F0 | 53 | 4A | 0F | C4 | 42 | 4A | 30 | F0 | 0F | 20 |
| 000B35: | F1 | 16 | 30 | F2 | 24 | D5 | 4B | 3A | 75 | 4B | 64 | 02 | 0B | 63 | 20 | F1 |
| 000B45: | F1 | C2 | F2 | C2 | F3 | 02 | 0B | 77 | 20 | F3 | 27 | D2 | F3 | E5 | 49 | B4 |
| 000B55: | 09 | 00 | 50 | 27 | 74 | 10 | 02 | 0B | 82 | 75 | 4B | FE | D2 | F2 | 20 | F0 |
| 000B65: | 08 | D5 | 49 | 0E | 05 | 49 | 82 | 08 | 77 | 05 | 49 | E5 | 49 | B4 | 11 | 02 |
| 000B75: | 15 | 49 | E5 | 49 | 60 | 05 | B4 | 11 | 00 | 40 | 04 | 74 | 01 | F5 | 49 | B5 |
| 000B85: | 06 | 00 | 43 | 20 | F0 | 40 | 04 | C2 | 87 | C2 | 06 | A2 | 67 | 92 | 05 | E5 |
| 000B95: | 49 | 14 | 54 | 0F | 90 | 0B | A6 | 93 | 53 | 2C | C0 | 42 | 2C | 85 | F0 | 4C |
| 000BA5: | 22 | 02 | 04 | 08 | 10 | 03 | 05 | 09 | 11 | 22 | 24 | 28 | 30 | 23 | 25 | 29 |
| 000BB5: | 31 | | | | | | | | | | | | | | | |

Object Code Copyright 1987 AMP INCORPORATED

We claim:

by the presence of the headlamp on signal in order to illuminate the headlamp at increased intensity.

2. The invention of claim 1 wherein the second duty cycle is 100% such that the second multiplexed signal is maintained in the first state.

3. The invention of claim 1 wherein the first and second multiplexed signals are time multiplexed signals.

4. The invention of claim 1 wherein the automatically cycling means operates with a cycle period of about 16 milliseconds.

5. The invention of claim 4 wherein the first duty cycle is about 40%.

6. The invention of claim 1 wherein the remote stations are each connected to the controller by at least one clock conductor and at least one data conductor, wherein the multiplex system comprises means for generating a clock signal on the at least one clock conductor to synchronize operation of the remote stations with the controller, and wherein the first and second multiplexed signals are transmitted on the at least one data conductor as time multiplexed signals.

7. The invention of claim 1 wherein the electrical power source supplies a DC voltage.

8. The invention of claim 1 wherein the headlamp comprises an incandescent lamp.

9. In a vehicle headlamp control system in a vehicle of the type comprising a headlamp; an electrical power source; means for generating a headlamp on signal; means for selectively interconnecting the headlamp and the power source with a low resistance current path and disconnecting the headlamp and the power source; a multiplex system comprising: a data bus; a clock bus; a controller comprising clock means, coupled to the clock bus, for applying repeated sets of clock signals to the clock bus, means for reading data signals from the data bus, and means for applying data signals to the data bus; a first remote station coupled to receive the headlamp on signal and connected to the clock and data buses, said first remote station comprising means for counting the clock pulses in each set and for enabling the first remote station during a first selected subset of the clock pulses, and means for applying a first multiplexed signal, indicative of the state of the headlamp on signal, to the data bus when the first remote station is enabled; a second remote station connected to the clock and data buses, said second remote station comprising means for counting the clock pulses in each set and for enabling the second remote station during a second selected subset of clock pulses, means for reading a second multiplexed signal from the data bus when the second remote station is enabled, and means for controlling the interconnecting means in response to the state of the second multiplexed signal; the improvement comprising:

first means, included in the controller, for selectively generating said second multiplexed signal in a first state, which causes the second remote station to control the interconnecting means to interconnect the headlamp and the power source, and a second state, which causes the second remote station to control the interconnecting means to disconnect the headlamp and the power source;

means, included in the first means, for automatically cycling the second multiplexed signal between the first and second states at a first duty cycle during selected periods characterized by the absence of the headlamp on signal in order to illuminate the headlamp at reduced intensity;

means, included in the first means, for automatically placing the second multiplexed signal in the first state with a second duty cycle higher than the first duty cycle during selected periods characterized by the presence of the headlamp on signal in order to illuminate the headlamp at increased intensity.

10. The invention of claim 9 wherein the second duty cycle is 100% such that the second multiplexed signal is maintained in the first state.

11. The invention of claim 9 wherein the automatically cycling means operates with a cycle period of about 16 milliseconds.

12. The invention of claim 9 wherein the first duty cycle is about 40%.

13. The invention of claim 9 wherein the electrical power source supplies a DC voltage.

14. The invention of claim 9 wherein the headlamp comprises an incandescent lamp.

15. In a motor speed control system for a motor system of the type comprising a continuous DC motor; a DC electrical power source; means for generating at least one motor speed control signal; means for selectively interconnecting the motor and the electrical power source with a low resistance current path and disconnecting the motor and the power source; a multiplex system comprising: a controller; a first remote station coupled to receive the at least one motor speed control signal and connected to the controller, said first remote station comprising means for sending first multiplexed signals to the controller indicative of the state of the motor speed control signal; a second remote station connected to the controller and comprising means for receiving a second multiplexed signal from the controller and for controlling the interconnecting means in response to the state of the second multiplexed signal; the improvement comprising:

means, included in the motor speed control signal generating means, for selectively placing the at least one motor speed control signal in a high speed state, commanding high speed motor operation, a low speed state, commanding low speed motor operation, and an off state, commanding motor off operation;

first means, included in the controller, for selectively generating said second multiplexed signal in a first state, which causes the second remote station to control the interconnecting means to interconnect the motor and the power source, and a second state, which causes the second remote station to control the interconnecting means to disconnect the motor and the power source;

means, included in the first means, for automatically cycling the second multiplexed signal between the first and second states at a first duty cycle when the motor speed control signal is in the low speed state;

means, included in the first means, for placing the second multiplexed signal in the first state with a second duty cycle higher than the first duty cycle when the motor speed control signal is in the high speed state; and means, included in the first means, for automatically placing the second multiplexed signal in the second state when the motor speed control signal is in the off state.

16. The invention of claim 15 wherein the second duty cycle is 100%, such that the second multiplexed signal is maintained in the first state when the motor speed control signal is in the high speed state.

17. The invention of claim 15 wherein the second duty cycle is less than 100% such that the second multiplexed signal is automatically and periodically cycled between the first and second states when the motor speed control signal is in the high speed state.

18. The invention of claim 15 wherein the DC continuous motor is a fan motor for a vehicle.

19. The invention of claim 15 wherein the controller is interconnected with the remote stations by clock and data buses, wherein the controller comprises clock means for generating repeated ses of clock pulses, and wherein each of the remote stations comprises counter means for counting the clock pulses in each set and means for interacting with the respective data bus during selected time intervals defined by selected ones of the clock pulses.

20. The invention of claim 19 wherein the interacting means comprises:
   means for reading and storing a first signal from the data bus during first selected time intervals; and
   means for applying a second signal to the data bus during second selected time intervals.

* * * * *

UNITED STATES PATENT OFFICE
CERTIFICATE OF CORRECTION

Patent No. 4,845,619      Dated July 4, 1989

Inventor(s) Lee Walter Steely et al

It is certified that error appears in the above-identified patent and that said Letters Patent is hereby corrected as shown below:

In claim 19, column 13, line 11, the word "ses" should be
--sets--.

Signed and Sealed this

Third Day of July, 1990

Attest:

HARRY F. MANBECK, JR.

*Attesting Officer*     *Commissioner of Patents and Trademarks*